United States Patent
Mori et al.

(10) Patent No.: US 7,369,129 B2
(45) Date of Patent: May 6, 2008

(54) AUTOMATED USER INTERFACE TESTING

(75) Inventors: Nobuyoshi Mori, Lorsch (DE);
Gundula Niemann, Wiesloch (DE);
Ming Xu, Dossenheim (DE)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 11/151,810

(22) Filed: Jun. 13, 2005

(65) Prior Publication Data
US 2006/0279571 A1   Dec. 14, 2006

(51) Int. Cl.
*G06T 11/20* (2006.01)
*G06F 11/00* (2006.01)
*G06K 9/00* (2006.01)
*G06K 9/68* (2006.01)

(52) U.S. Cl. .................. 345/443; 714/38; 382/149; 382/226

(58) Field of Classification Search ................ 345/443; 382/149, 226; 714/38
See application file for complete search history.

(56) References Cited

U.S. PATENT DOCUMENTS

| | | | | |
|---|---|---|---|---|
| 4,696,003 A * | 9/1987 | Kerr et al. ................ 714/38 |
| 5,335,342 A * | 8/1994 | Pope et al. ................ 714/38 |
| 5,634,002 A * | 5/1997 | Polk et al. ................ 714/38 |
| 5,812,122 A * | 9/1998 | Ng ............................ 715/703 |
| 6,757,645 B2 * | 6/2004 | Chang et al. .............. 703/13 |
| 6,870,951 B2 * | 3/2005 | Cai ........................... 382/149 |
| 6,925,202 B2 * | 8/2005 | Karklin et al. ............ 382/145 |
| 7,031,529 B2 * | 4/2006 | Lee et al. .................. 382/226 |
| 2004/0002996 A1 | 1/2004 | Bischof et al. |

OTHER PUBLICATIONS eCATT: extended Computer Aided Test Tool (BC-TWB-TST-ECA), http://help.sap.com/saphelp_erp2004/helpdata/en/ib/e81c3b84e65e7be.. (2 pages).

* cited by examiner

*Primary Examiner*—Jin-Cheng Wang
(74) *Attorney, Agent, or Firm*—Fish & Richardson P.C.

(57) ABSTRACT

Methods and apparatus, including computer program products, implementing techniques for testing user interfaces of software application. The techniques include interacting with a user to identify one or more straight lines in a first rendering of a user interface for a software application, the straight lines being diagnostic of the correct layout of the first rendering of the user interface, and using the one or more straight lines as reference lines to determine if a second rendering of the user interface has a correct layout.

21 Claims, 4 Drawing Sheets

AUTOMATED USER INTERFACE TESTING

BACKGROUND

The present invention relates to data processing by digital computer, and more particularly to user interface testing for software applications.

Conventionally, user interface testing for software applications is performed manually. Typically, a user interface is displayed, and a tester, for example, a developer or a quality analysis engineer, inspects the displayed user interface for errors.

Once a user interface has been tested, it may subsequently need to be retested, for example, because modifications were made to the application. Typically, the retesting is also performed manually.

SUMMARY OF THE INVENTION

The present invention provides methods and apparatus, including computer program products, that implement techniques for testing user interfaces of software applications.

In one general aspect, the techniques include interacting with a user to identify one or more straight lines in a first rendering of a user interface for a software application, the straight lines being diagnostic of the correct layout of the first rendering of the user interface; and, using the one or more straight lines as reference lines to determine if a second rendering of the user interface has a correct layout.

Implementations of the invention can include one or more of the following features. Interacting with a user to identify one or more straight lines includes receiving user input identifying the one or more straight lines. Interacting with a user to identify one or more straight lines includes receiving user input selecting a section of the user interface and identifying one or more straight lines within the selected section. Identifying one or more straight lines within the selected section includes determining color differences in the selected section and identifying the one or more straight lines based on the color differences.

Using the one or more straight lines as reference lines to determine if a second rendering of the user interface has a correct layout includes, for each reference line, identifying attributes of the reference line and determining whether the second rendering of the user interface has a straight line with attributes that match the attributes of the reference line within a level of tolerance. The attributes include one or more of position, color, thickness, brightness, length and width.

The invention can be implemented to realize one or more of the following advantages. User interface testing is automated. An automated testing process can inspect only one or a few lines of the user interface rather than the entire user interface. The line inspection reduces the amount of memory and processing required to perform the test. The line inspection focuses the test on the significant portion of the user interface. Thus, the testing process does not waste computational effort inspecting portions of the user interface that are not significant. The line inspection can be robust to slight variations in the user interface design or in the resolution that the user interface is displayed in. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
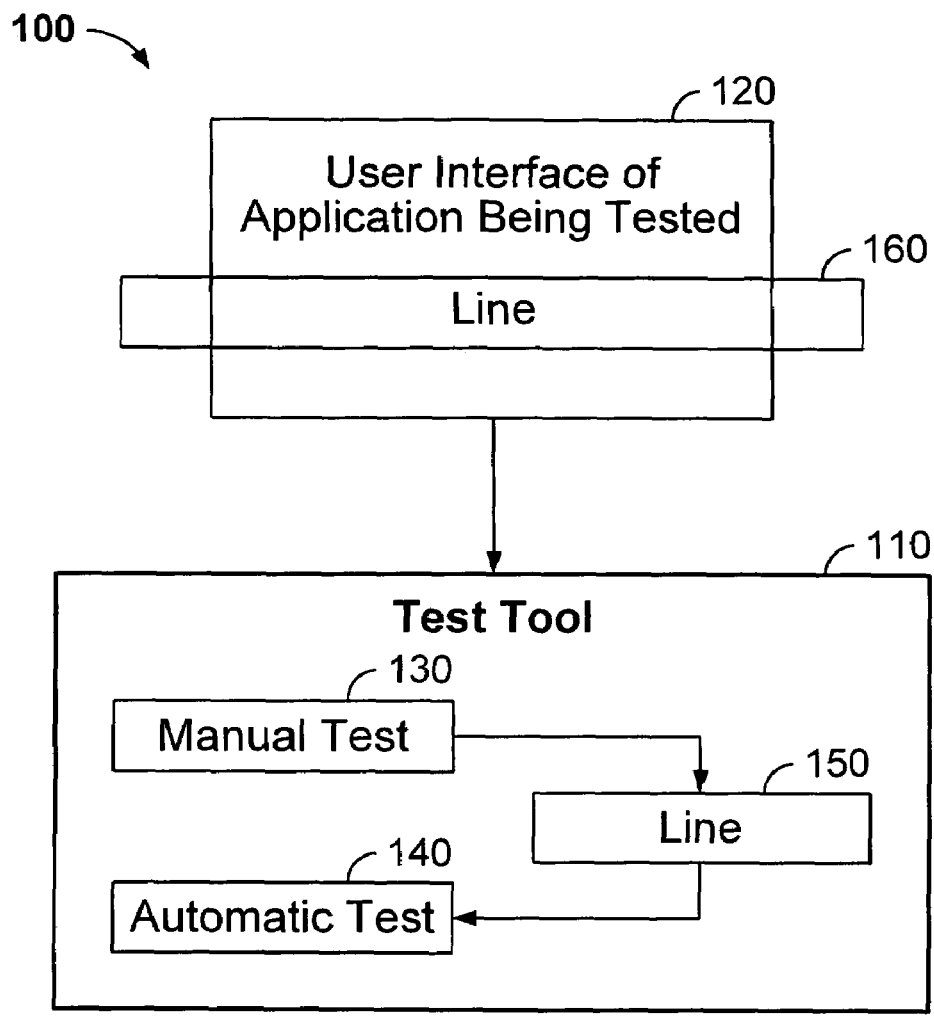
FIG. 1 illustrates a system in accordance with one implementation of the invention.

As illustrated in FIG. 1, a system 100 in accordance with one implementation of the invention includes a test tool 110 for testing a user interface 120 of a software application. The test tool is operable to perform a manual test process 130 on the user interface. The manual test process involves user intervention. The test tool is also operable to perform an automatic test process 140 on the user interface. The automatic test process does not involve any user intervention.

During the manual test process, the test tool identifies at least one straight line 150 in a first rendering of a user interface. The straight line is diagnostic of the correct layout of the first rendering of the user interface. The straight line can be a horizontal line, a vertical line, or a diagonal line. The straight line can be, for example, the edge or border between color areas. The straight line is stored for subsequent use during the automatic test process. During the automatic test process, the test tool uses the stored straight line to determine if a second rendering of the user interface has a correct layout.

Figure 2:
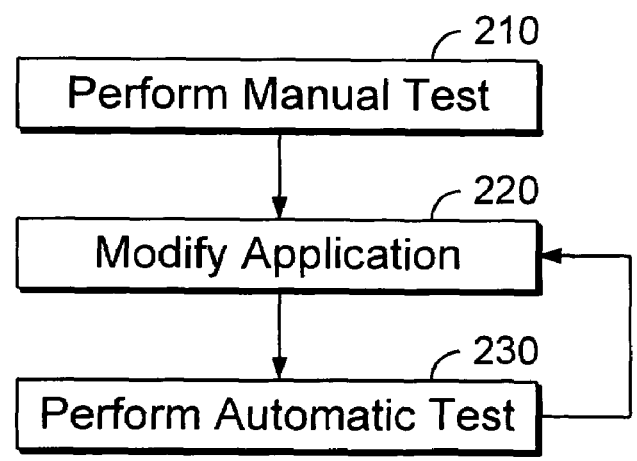
FIG. 2 illustrates a method in accordance with one implementation of the invention.

In one use of the system, as illustrated in FIG. 2, the manual test process is performed on the user interface (step 210). Subsequently, the application is modified (step 220). For example, a patch or upgrade is applied to the application. To make sure that the modifications to the application have not introduced any errors or unacceptable changes into the user interface of the application, the user interface is then retested. The user interface is retested by performing the automatic test process on the user interface (step 230). If the application is modified again, the automatic test process can be repeated. In this manner, the test tool can perform the manual test process just once, and then any further testing can be performed automatically.

Figure 3:
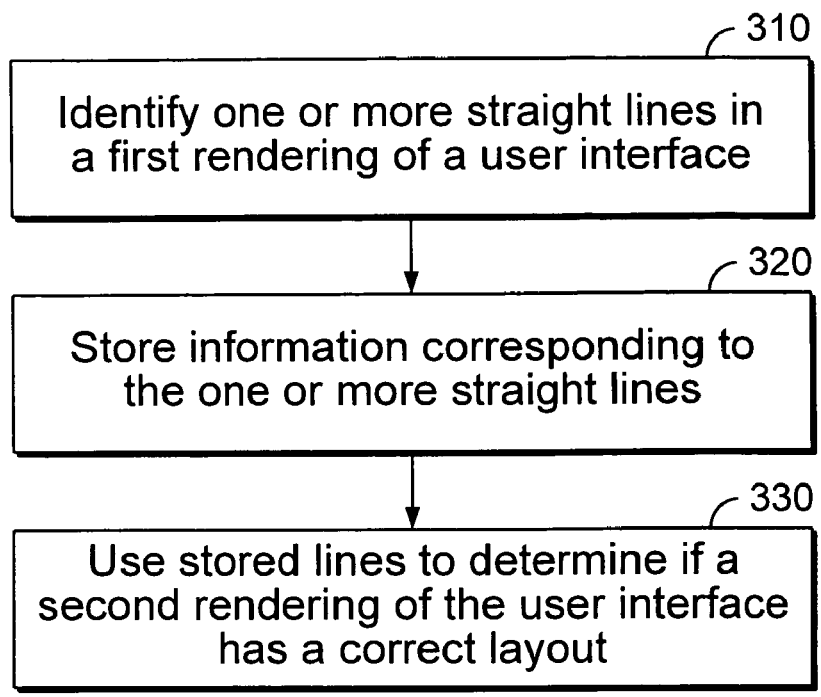
FIGS. 3, 4, and 5 illustrate one implementation of a manual testing process and an automatic testing process.

As illustrated in FIG. 3, during the manual test process, the test tool interacts with a user to identify one or more straight lines in a first rendering of a user interface (step 310). In one implementation, the test tool receives user input identifying the one or more straight lines.

Figure 4:
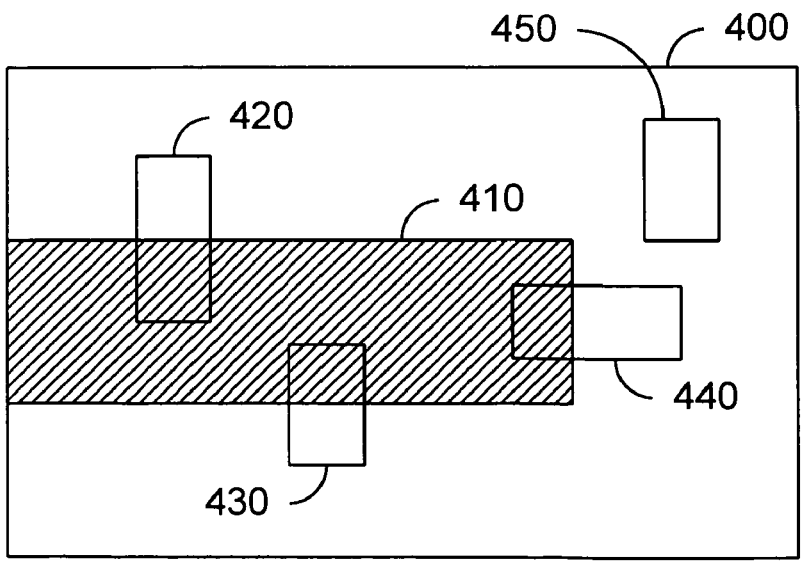

In an alternative implementation, the test tool receives user input selecting a section of the user interface. For example, the tester can draw a rectangular marquee around a section of the user interface. The test tool then identifies a straight line within the selected section. The test tool can identify the straight line based on color differences between pixels in the selected section. The test tool compares the color values of adjacent pixels and looks for areas where there is a significant change in color. For example, FIG. 4 illustrates an example section 400 that contains a horizontal line 410. The test tool detects a significant color change in certain areas of the image 420, 430, 440, but not in other areas 450. Based on the relative positions of the areas 420, 430, 440 with significant color change, the test tool identifies a horizontal line of a certain thickness and length. Optionally, once the test tool has identified the line, the test tool can obtain input from the user verifying the correctness of the identification.

The test tool stores information corresponding to the identified one or more straight lines (step 320). In one implementation, the test tool stores a graphical image of each of the one or more straight lines along with the position of the graphical image relative to the entire user interface. The graphical image can include not only the line itself, but also the surrounding region, for example, the entire section within the user-drawn marquee. Alternatively, the test tool stores textual data specifying one or more attributes of each line, for example, one or more of a start and end position for the line, a thickness of the line, and color or brightness properties of the line. The attributes can be expressed as absolute values (e.g., pixel coordinates) or as percentage values (e.g., the line spans 80% of the horizontal axis of the user interface). As will be described further below, the stored line information can be used by the test tool during the automatic test process as a reference to test against.

Figure 5:
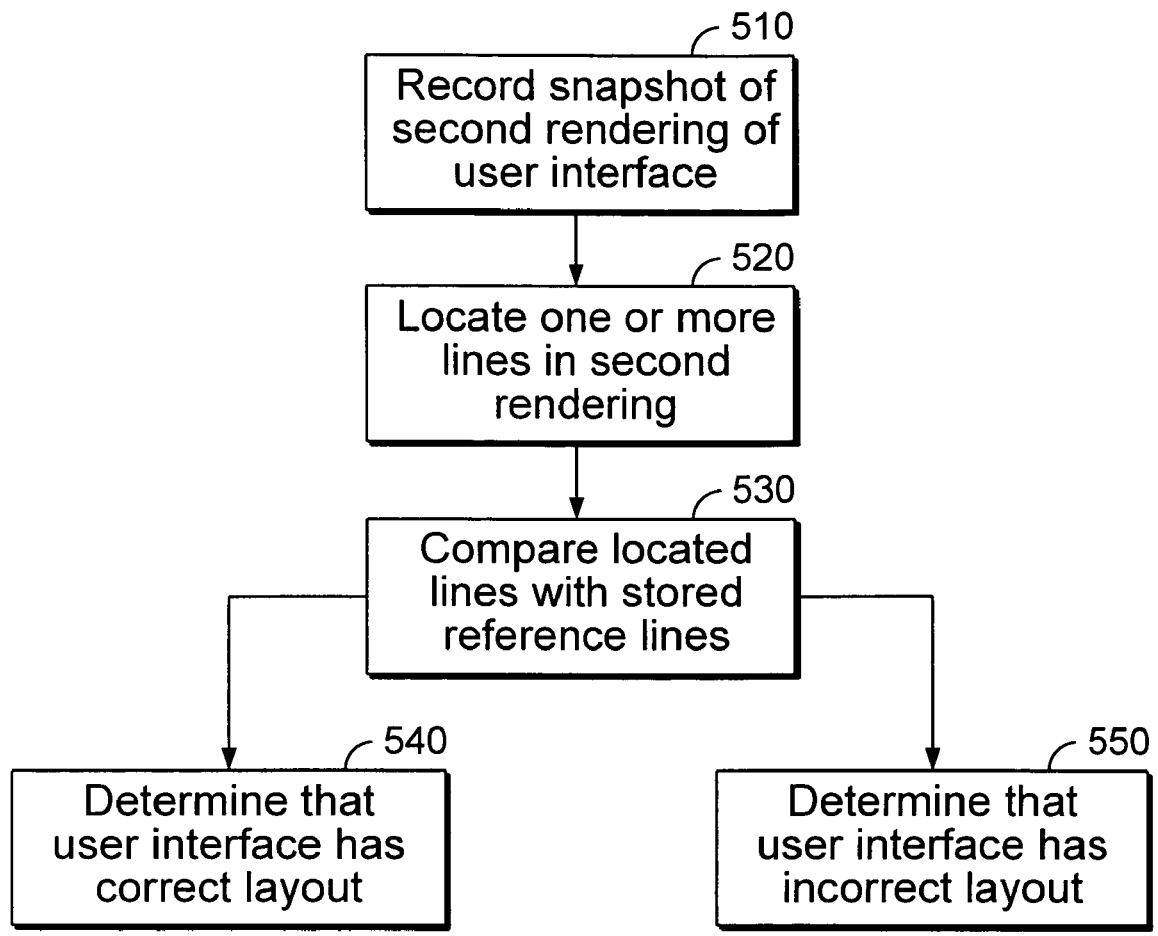

During the automatic test process, the test tool uses the one or more stored reference lines to determine if a second rendering of the user interface has a correct layout (step 330). In one implementation, as illustrated in FIG. 5, the test tool records a snapshot of the second rendering of the user interface (step 510). The test tool locates one or more lines within the snapshot (step 520). The lines can be located automatically by locating color differences as previously described.

The test tool then compares the located lines in the second rendering of the user interface with the stored references lines from the first rendering of the user interface (step 530). For example, the test tool can compare the attributes of the respective line.

If the lines match, then the test tool determines that the second rendering of the user interface has a correct layout (540). Otherwise, the test tool determines that the layout of the second rendering of the user interface is not correct (550).

In one implementation, lines match so long as any variance between the lines falls within a level of tolerance. The variance can be due to minor design or content changes in the user interface, or due to differences in the resolution in which the stored image and the snapshot are displayed. The user can configure the amount of variance that is tolerable. The tolerance values can be associated with the stored reference lines, for example, as additional line attributes. Each reference line can have its own tolerance value. Alternatively, the tolerance value can be shared by a collection of reference lines within a test, or by multiple tests within a test suite.

In the above-described implementation, the reference lines are identified and recorded during the manual test process and then used during the automatic test process. Alternatively, the reference lines can be received from another source besides the manual test process. For example, a tester can generate one or more graphical images containing reference lines and store these graphical images in one or more files. The automatic test process can use not only the reference lines recorded live during the manual test process, but also the pre-generated reference lines stored in the files.

Figure 6:
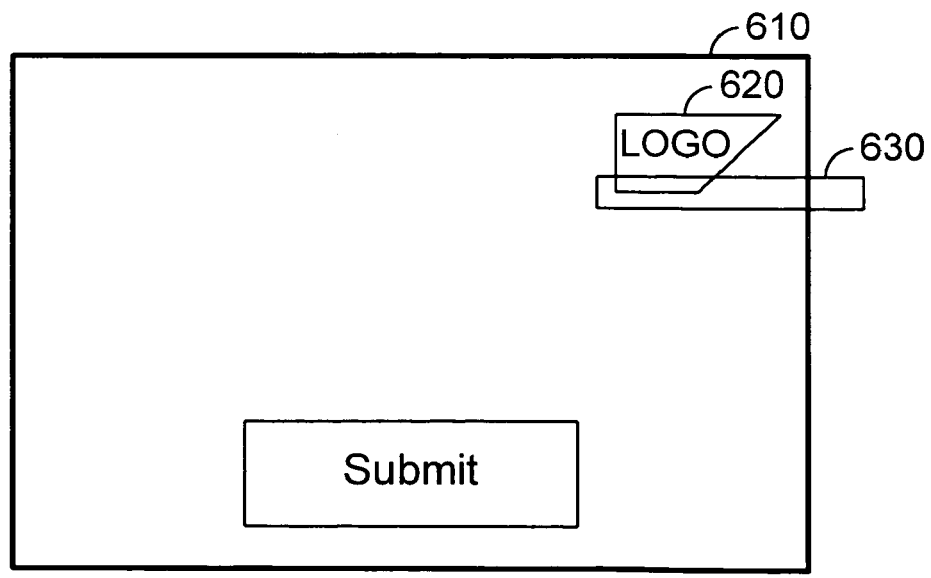
FIGS. 6, 7 and 8 illustrate an internationalization scenario.
Figure 7:
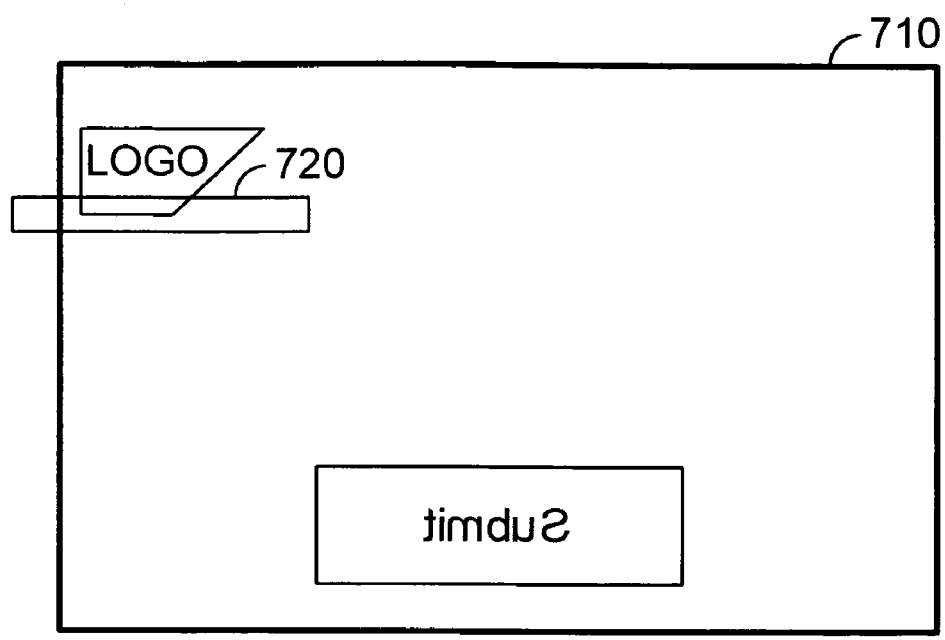
Figure 8:
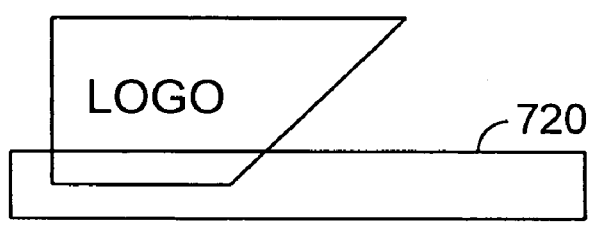
Figure 8:
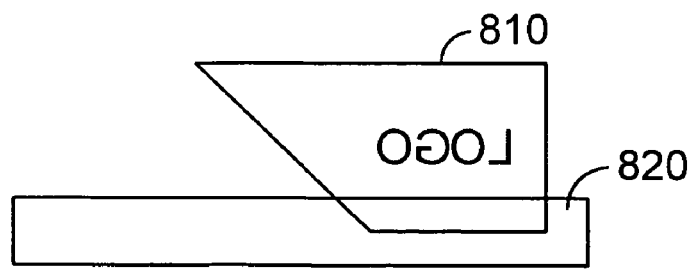

The above-described testing techniques can be used in a variety of different testing scenarios. For example, one scenario involves the internationalization of user interfaces. In some countries, text is viewed from left-to-right, whereas in other countries, text is viewed right-to-left. As illustrated in FIGS. 6 and 7, a user interface 610 designed to display text in one direction (left to right) can be inverted to produce a user interface 710 suitable for displaying text in the reverse direction (right to left). In some cases, the inversion can be selective. That is, the inversion process can be designed leave certain portions of the user interface non-inverted. For example, in the inverted user interface 710 shown in FIG. 7, the portion corresponding to the logo was correctly left non-inverted. A line 720 corresponding to the bottom of the logo can be stored and used as a reference for testing other renderings of the user interface. If in a second rendering of the user interface, the logo was mistakenly inverted 810, as shown in FIG. 8, then the line 820 corresponding to the bottom of the logo in the second rendering will not match the stored line 720.

The above-described testing techniques can be implemented as a stand-alone application, or as part of a larger application, for example, as part of the eCATT (Extended Computer Aided Test Tool) application available from SAP AG of Walldorf (Baden), Germany, or as an extension to an existing test tool.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some cases, the client and server can be on the same computer.

The invention has been described in terms of particular embodiments, but other embodiments can be implemented and are within the scope of the following claims. In certain implementations, multitasking and parallel processing may be preferable. Other embodiments are within the scope of the following claims.

What is claimed is:

1. A computer program product, tangibly embodied in a machine-readable storage medium, the computer program product comprising instructions that, when read by a machine, operate to cause data processing apparatus to perform operations comprising:

interacting with a user to receive a selection of a section of a first rendering of a user interface;

automatically identifying one or more first straight lines in the section, each of the one or more first straight lines having one or more respective attributes;

storing the one or more attributes for each of the one or more first straight lines, the one or more attributes for each of the one or more first straight lines being stored as line textual data that specifies the respective one or more attributes for each of the one or more first straight lines; receiving a second rendering of the user interface by a software application, the second rendering being rendered by a modified version of the software application; and using the attributes stored as the line textual data to determine whether or not each of the one or more first straight lines matches a corresponding one of one or more second straight lines in the second rendering of the user interface without matching a section region surrounding a line region occupied by the one or more first straight lines, and if not, determining that the layout of the second rendering of the user interface is not correct.

2. The computer readable storage medium of claim 1 wherein interacting with a user to identify one or more first straight lines includes:

obtaining a verifying user input verifying a correctness of the automatic identification.

3. The computer readable storage medium of claim 1, wherein automatically identifying one or more first straight lines within the selected section includes determining color differences in the selected section and identifying the one or more first straight lines based on the color differences.

4. The computer readable storage medium of claim 1 wherein using the textual data to determine whether or not each of the one or more first straight lines matches a corresponding one of the one or more second straight lines includes:

for each first straight line, determining whether a corresponding straight line in the second rendering has attributes that match the attributes of the first straight line within a level of tolerance, wherein the attributes of the first and second straight lines are stored and matched as line textual data and not graphical image data.

5. The computer readable storage medium of claim 1, wherein the attributes identified for each first straight line include one or more of a start position, an end position, a thickness, a length or a width.

6. The computer readable storage medium of claim 1 wherein the one or more first straight lines are matched with the corresponding one of one or more second straight lines on a line-by-line basis and not a pixel-by-pixel basis.

7. The computer readable storage medium of claim 1, further comprising instructions that operate to cause data processing apparatus to perform operations comprising storing a graphical image of each of the one or more first straight lines separately from the line textual data, wherein the one or more first straight lines are matched with the corresponding one of one or more second straight lines without accessing the stored graphical image.

8. The computer readable storage medium of claim 1, wherein the line textual data is not pixel textual data.

9. The computer readable storage medium of claim 1, wherein the section region is larger than the line region.

10. A computer-implemented method comprising:

interacting with a user to receive a selection of a section of a first rendering of a user interface;

automatically identifying one or more first straight lines in the section, each of the one or more first straight lines having one or more respective attributes;

storing the one or more attributes for each of the one or more first straight lines, the one or more attributes for each of the one or more first straight lines being stored as line textual data that specifies the respective one or more attributes for each of the one or more first straight lines;

receiving a second rendering of the user interface by a software application, the second rendering being rendered by a modified version of the software application; and using the attributes stored as the line textual data to determine whether or not each of the one or more first straight lines matches a corresponding one of one or more second straight lines in the second rendering of the user interface without matching a section region surrounding a line region occupied by the one or more first straight lines, and if not, determining that the layout of the second rendering of the user interface is not correct.

11. The method of claim 10, wherein interacting with a user to identify one or more first lines includes:

obtaining a verifying user input verifying a correctness of the automatic identification.

12. The method of claim 10, wherein automatically identifying one or more first straight lines within the selected section includes determining color differences in the selected section and identifying the one or more first straight lines based on the color differences.

13. The method of claim 10, wherein using the textual data to determine whether or not each of the one or more first straight lines matches a corresponding one of the one or more second straight lines includes:

for each first straight line, determining whether a corresponding straight line in the second rendering has attributes that match the attributes of the first straight line within a level of tolerance, wherein the attributes of the first and second straight lines are stored and matched as the line textual data and not graphical image data.

14. The method of claim 10, wherein the attributes identified for each first straight line include one or more of a start position, an end position, a thickness, a length or a width.

15. A system comprising:

an input device configured to interact with a user to receive a selection of a section of a first rendering of a user interface; and a processor configured to:

automatically identify one or more first straight lines in the section, each of the one or more first lines having one or more respective attributes, access the one or more attributes for each of the one or more first straight lines, the one or more attributes for each of the one or more first straight lines being stored as line textual data that specifies the respective one or more attributes for each of the one or more first straight lines, receive a second rendering of the user interface by a modified version of a software application, and use the attributes stored as the line textual data to determine whether or not each of the one or more first straight lines matches a corresponding one of one or more second straight lines in the second rendering of the user interface without matching a section region surrounding a line region occupied by the one or more first straight lines, and if not, determining that the layout of the second rendering of the user interface is not correct.

16. The system of claim 15, wherein interacting with a user to identify one or more first straight lines includes:

obtaining a verifying user input verifying a correctness of the automatic identification.

17. The system of claim 15, wherein automatically identifying one or more first straight lines within the selected section includes determining color differences in the selected section and identifying the one or more first straight lines based on the color differences.

18. The system of claim 15, wherein using the textual data to determine whether or not each of the one or more first straight lines matches a corresponding one of the one or more second straight lines includes:

for each first straight line, determining whether a corresponding straight line in the second rendering has attributes that match the attributes of the first straight line within a level of tolerance, wherein the attributes of the first and second straight lines are stored and matched as the line textual data and not graphical image data.

19. The system of claim 15, wherein the attributes identified for each first straight line include one or more of a start position, an end position, a thickness, a length or a width.

20. A computer-implemented method comprising:

receiving a user input selecting a section of a first rendering of a user interface;

automatically identifying a first straight line within the selected section based on color differences between pixels in the selected section;

storing line textual data specifying one or more attributes of the automatically identified first straight line, the line textual data specifying one or more of a start position, an end position, a thickness, a color, or a brightness attributes of the automatically identified line;

accessing a second rendering of the user interface;

automatically identifying a second straight line within the second rendering of the user interface based on color differences between pixels in the second rendering of the user interface;

comparing the line textual data of the first straight line with attributes of the second straight line without comparing a region within the section surrounding a region defined by the first straight line; and determining whether the second rendering of the user interface has a correct layout based on comparing the first and second straight lines.

21. The method of claim 20, further comprising obtaining a verifying user input verifying a correctness of the automatic identification.

* * * * *